United States Patent
Fischer

(10) Patent No.: US 7,963,823 B2
(45) Date of Patent: Jun. 21, 2011

(54) MACHINING MACHINE WITH MEANS FOR ACQUIRING MACHINING PARAMETERS

(75) Inventor: Harald Fischer, Braubach (DE)

(73) Assignee: Peter Wolters GmbH, Rendsburg (DE)

( * ) Notice: Subject to any disclaimer, the term of this patent is extended or adjusted under 35 U.S.C. 154(b) by 543 days.

(21) Appl. No.: 12/046,785

(22) Filed: Mar. 12, 2008

(65) Prior Publication Data
US 2008/0304929 A1 Dec. 11, 2008

(30) Foreign Application Priority Data
Mar. 13, 2007 (DE) .................. 10 2007 011 880

(51) Int. Cl.
*B24B 49/00* (2006.01)

(52) U.S. Cl. .............................. 451/8; 451/194; 451/210

(58) Field of Classification Search .............. 451/8, 190, 451/194, 209, 210
See application file for complete search history.

(56) References Cited

U.S. PATENT DOCUMENTS
6,544,111 B1 * 4/2003 Kimura et al.
6,976,900 B2 * 12/2005 Bolz FOREIGN PATENT DOCUMENTS
| DE | 10237682 | | 3/2004 |
| DE | 10344602 | * | 5/2005 |
| DE | 102004040429 | * | 2/2006 |
| JP | 2004358638 | | 12/2004 |

* cited by examiner

*Primary Examiner* — Maurina Rachuba
(74) *Attorney, Agent, or Firm* — Hiscock & Barclay, LLP

(57) ABSTRACT

A machining machine with an upper rotatingly drivable machining disc, the annular machining plane of which has a machining coating and is facing a lower machining plane, wherein the machining planes form a machining gap between each other. Plural rotor discs are arranged in the gap, which accommodate workpieces in recesses and which can be brought into rotation by means of a roll-off device, wherein the workpieces move along a cycloid path, wherein plural sensor elements for acquiring at least one machining parameter are arranged in the upper machining disc, distributed across its cross section, the sensor elements are each one coupled to an active or passive RFID chip and a reading device is assigned to the upper machining disc for reading out the RFID chips.

8 Claims, 1 Drawing Sheet

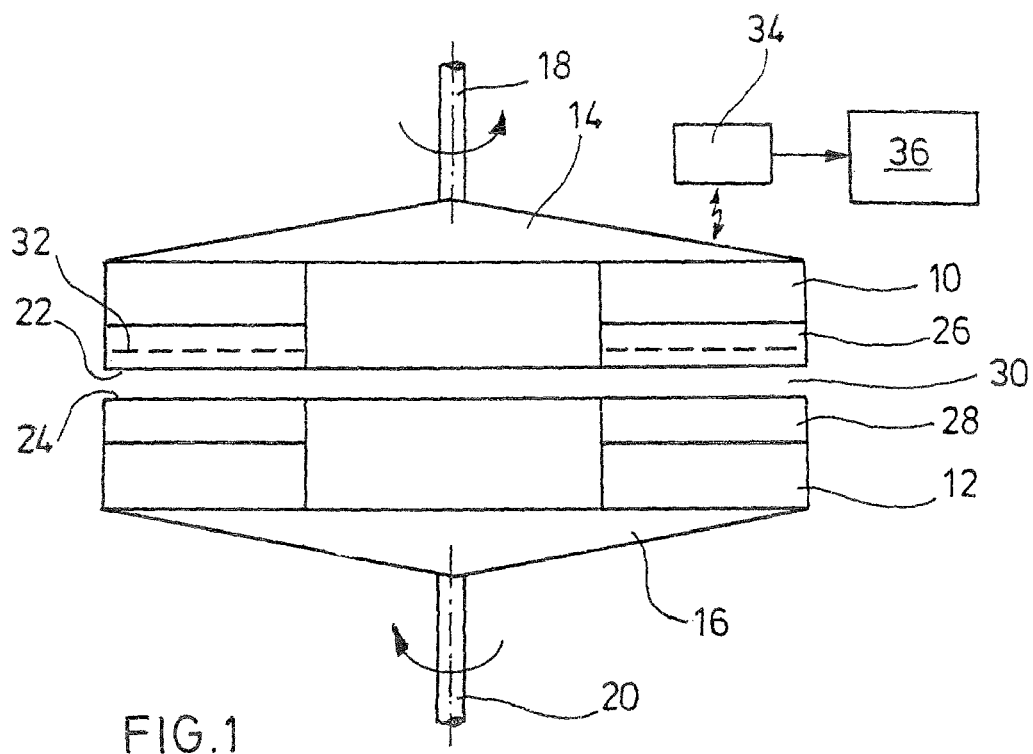
FIG.1
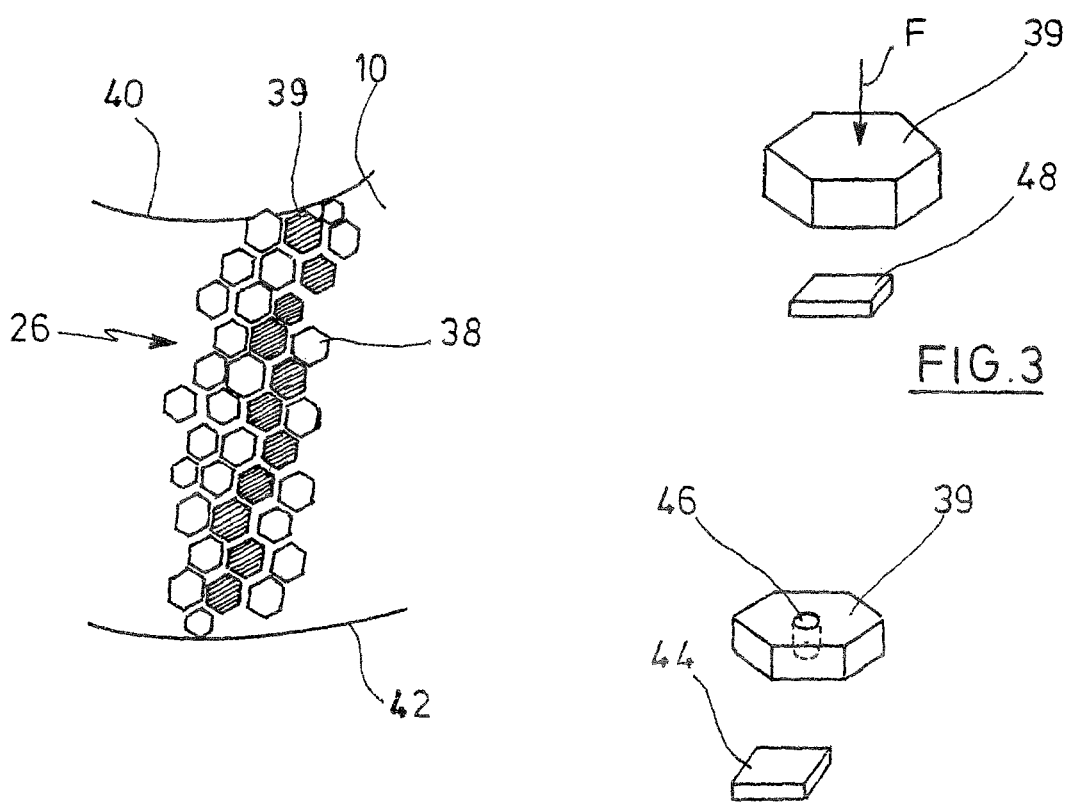
FIG.2
FIG.3
FIG.4

MACHINING MACHINE WITH MEANS FOR ACQUIRING MACHINING PARAMETERS

CROSS REFERENCE TO RELATED APPLICATIONS

This application is based upon and claims priority under 35 USC §119 to DE 10 2007 011 880.7, filed Mar. 13, 2007, entitled: MACHINING MACHINE WITH MEANS FOR ACQUIRING MACHINING PARAMETERS, the entire contents of which is herein incorporated by reference.

FIELD OF THE INVENTION

The present invention is related to a machining machine with means for acquiring machining parameters.

BACKGROUND OF THE INVENTION

The present invention is related to a machining machine having at least one upper machining disc with annular machining plane, which is rotatingly drivable around a vertical axis. A lower machining plane is assigned to the upper machining plane, which is either stationary or mounted on a lower machining disc. Between the machining planes, a machining gap is formed, in which rotor discs are arranged, which accommodate workpieces in recesses. On their part, the rotor discs are brought into a rotational movement with the aid of a rolling device, with the aid of pin- or tooth rings for instance, so that they move on a cycloid path with the workpieces. Machining machines with upper and lower machining disc are called double side machines. With the same, a plane-parallel machining of the workpieces is performed, of semiconductor discs (wafers) for instance. The machining may consist of grinding, lapping, polishing or the like. Depending on the machining process, the machining planes have machining coatings which engage with the workpiece planes. Depending on the machining process, a tapping fluid is introduced into the machining gap, which optionally contains polishing or lapping material, respectively.

In DE 103 44 602 A1 for instance, a grinding method according to the so-called "floating processing" is disclosed in order to perform an abrasion of material rapidly and in a cost-saving manner. In this method, the workpieces are accommodated relatively loosely in the recesses of the rotor discs.

The geometry of the machining gap is decisive for the precision of the workpieces, i.e. their absolute evenness and parallelism. It is crucial that the machining gap is formed by parallel machining planes which are as parallel as possible. However, it has been proven that thermal expansion effects influence the machining gap and lead to an undesired workpiece geometry. The deformation of the machining discs during the grinding process is due to a bimetal effect, in which regions of the machining disc are warmed up differently.

From DE 10 2004 040 429, it is known to use this bimetal effect to deform the machining disc by influencing the temperature of a carrier disc for the machining disc, namely depending on the temperature of the machining disc. The latter is deformed such that the machining plane gets a certain contour in order to achieve a largely parallel machining gap.

In machining discs which have, without intermediate element, a machining coating which is abraded with increasing usage, it becomes necessary to replace the machining disc or to apply a new machining coating, when the same has been abraded for a certain amount.

For the condition of the machining gap or its control, respectively, the temperature in the machining gap is decisive. From the document cited above, it is already known to measure the temperature of the machining disc or in the machining gap, respectively, besides to the distance of the machining discs.

The upper machining disc is pressed against the lower machining disc with a preset pressure. The pressure is not inessential for the temperature and the degree of abrasion in the course of time. In known machining machines, a preset pressure can be applied to the machining disc without that it is known how great the pressure per unit area of the plane to be machined of the workpieces is.

SUMMARY OF THE INVENTION

The present invention is based on the objective to improve a machining machine of the aforementioned type such that it features means for acquiring at least one operation parameter, which can be arranged and read off in a simple form.

In the machining machine of the present invention, plural sensor elements for acquiring machining parameters are arranged in the upper machining disc, distributed across its cross section. The sensor elements are coupled to an active or passive RFID chip and a reading device is assigned to the upper machining disc for reading out the RFID chips.

RFID chips permit an automatic identification and localization of objects. They are also called transponders. They contain a chip with a memory and an antenna. Depending on energy and frequency band, such RFID chips can transmit data across a certain distance in a wireless manner to a reading device, when the same generates a request signal. The reading device generates a varying magnetic field of high frequency, which is received by the antenna of the RFID transponder. The induced current of the antenna coil of the chip activates the microchip in the transponder. In passive RFIDs a capacitor is charged, which provides for the voltage supply of the chip. The transponder emits a field, which contains at least a serial number or other data requested by the reading device.

It has also already become known to couple such RFID chips or transponders with sensors. According to one embodiment of the invention, pressure sensors may be provided, which measure the pressure which is directed from the machining plane towards the workpieces. Thus, with the aid of plural sensors, which are for instance arranged uniformly distributed across the machining plane in the machining disc, a pressure profile inside the machining gap can be determined. The same applies when temperature sensors are used. With a plurality of temperature sensors, a temperature profile inside the machining gap can be determined. As a consequence, by suitably influencing the geometry of the machining gap, control or adjustment can be performed depending on the temperature profile such that the desired geometry of the machining gap is achieved.

Finally, with the aid of sensors the wear of a coating for a machining disc can be sensed also, for instance in that the resonance frequency of the sensors changes with the thickness of the coating layer.

The individual RFID chips have a special identification key, and the distribution pattern of the chips inside the machining disc is known. As a consequence, the temperature, the pressure or another parameter in the machining gap can be determined more or less point-wise with respect to its coordinates.

In the reading device, the individual identification keys of the individual RFID chips are stored and can therefore be interrogated one after the other, in order to read out the parameter to be determined at the location of the chip. An electrostatic or electromagnetic field can be used for the communication between the reading device and the RFID chips.

Altogether, the use of sensor elements of the invention permits an improvement of the working operations, an enhancement of the workpiece quality, a reduction of the damage on workpiece surfaces and of the necessity of repeated machining. In addition, the idle time of the machining machine can be reduced.

BRIEF DESCRIPTION OF THE DRAWINGS

The present invention is explained in more detail in the following by means of drawings.

FIG. 1 is a schematic of a double side machining machine according to the invention;

FIG. 2 is a view of the machining plane of the upper machining disc according to FIG. 1 taken in section;

FIG. 3 is a segmented view of the machining disc according to FIG. 2 in a perspective view, together with a sensor; and FIG. 4 is a segmented view of the machining disc according to FIG. 2 in a perspective view, with another sensor.

DETAILED DESCRIPTION

An upper machining disc 10 and a lower machining disc 12 have each at a time a carrier disc 14 or 16, respectively, which can be rotatingly driven with the aid of a vertical driving shaft 18 or 20, respectively. The driving means of the machining discs as well as their mounting and also the possibility to swivel off the upper machining disc 10 in order to get access to workpieces between the machining discs is not depicted. Such a double side machining machine is commonly known.

The machining discs 10, 12 feature machining planes 22 and 24, respectively, which face each other. They are formed by cloths, like polishing or grinding cloths for instance, or even by a coating of an abrasive material, as is depicted in the present case at 26 and 28, respectively. The machining planes 22, 24 form a machining gap 30, which has to feature a constant width across its entire extension, as far as possible, in order to ensure plane parallel machining of workpieces in the machining gap 30. The geometry of the upper machining disc 10 can be influenced by thermal effects through the machining process (friction) in particular, for instance via a bimetal effect through varying warm-up. The workpieces in the machining gap 30 are kept by so-called rotor discs, which accommodate the workpieces in recesses. On their part, the rotor discs are brought into a cycloid path by rotation, wherein they roll of with an external toothing on pinned or toothed rings at the inside and the outside. Even this principle is commonly known.

For optimum operation of such a machining machine, it is advantageous to be able to measure one or plural machining parameters during the machining, for instance the temperature, the pressure on the workpieces, the wear of the machining coatings 26, 28, the width of the machining gap and the like. In FIG. 1, a plurality of sensor elements 32 is drawn in, distributed approximately uniformly across the cross section, which each at a time form an entity with a RFID chip. Such RFID chips with sensor elements are known and may have a comparatively very small dimension. They are embedded in a plane of the machining layer 26, which is parallel to the machining plane 22. The sensors can measure the temperature, the pressure, the width of the machining gap and so on, for instance. The RFID chips are passive and besides to a microprocessor they contain a memory, in which an identification key is filed which identifies the chip and the location where it is attached. With the aid of a reading device 34, the individual chips can be activated and interrogated one after the other, and with this also the condition of the sensors 32, i.e. their measured temperature, their measured pressure force, their measured width of the machining gap 30 and so on. After the activation, the elements 32 send out their signal to the reading device 34, which on its part gives the signals to a control- and adjustment unit 36, which functions to control and adjust the working process with the shown double side machining machine.

When the sensors 32 are executed as resonant circuits, their frequency changes depending on the distance to the machining plane 22. Alternatively, the change of the antenna resonance can be determined. By doing so, even the wear of the machining coating 26 can be determined. If necessary, plural parallel planes of elements 32 can also be provided, for instance in order to determine the wear or other parameters.

In the shown case, the machining coating 26 is constituted by individual hexagonal segments 38, which are bonded to each other by a suitable binder. For instance, the segments 38 are made of an abrasive material, which is bonded by a suitable binder. In FIG. 2, individual segments 39 are drawn darkly. They yield a line between the inner perimeter 40 and the outer perimeter 42 of the machining disc 10. A sensor element with RFID chip is arranged below or behind, respectively, of each of the segments 39. For instance, the sensor is a temperature sensor. In this way, it is possible to determine the temperature across the radius of the machining plane 22. Such a temperature sensor is shown in FIG. 4 at 44. It is situated behind a segment 39. A light guide fiber 46 is embedded into the segment 46.

The segment 39 in FIG. 3 is in front of a pressure sensor 48. It measures the force F, which is exerted upon the segment 39 during the machining operation.

The units consisting of sensor and RFID chip can have a housing or they may be built in without a housing. A supplementary external capacitor for energy supply can be arranged in the base material of the machining disc. The units can be cast in and burned in when the machining disc is manufactured. Other attachment possibilities can be conceived.

The units may also be coupled with DMS in order to measure the machining plane geometry.

The invention claimed is:

1. A machining machine with an upper rotatingly drivable machining disc, said disc having an upper annular machining plane which has a machining coating, and in which said upper machining plane faces a lower machining plane, wherein the machining planes form a machining gap between each other, in which are arranged plural rotor discs, which accommodate workpieces in recesses and which can be brought into rotation by means of a rolling device, whereby they move along a cycloid path, and in which plural sensor elements for acquiring at least one machining parameter are arranged in the upper machining disc, distributed across its cross section, said sensor elements each being coupled to an active or passive RFID chip, said machine further including a reading device which is assigned to the upper machining disc for reading out the RFID chips, and wherein the sensor elements with RFID chips are arranged in plural planes, said planes being parallel spaced apart and running parallel to the upper machining plane.

2. A machining machine according to claim 1, wherein the plural sensor elements with the RFID chips are approximately uniformly distributed across the cross section of the machining disc.

3. A machining machine according to claim 1, wherein the sensor elements with the RFID chips are arranged along a radius of the machining plane.

4. A machining machine according to claim 1, wherein at least one of the sensor elements and the antenna of the RFID chips have a resonant frequency that changes in relation with the distance of the machining plane from the sensor element and in which the change of the resonant frequency can be read out.

5. A machining machine according to claim 1, wherein the sensor elements are pressure sensors.

6. A machining machine according to claim 1, wherein the sensor elements are temperature sensors.

7. A machining machine according to claim 1, wherein the upper machining plane is formed by a multiplicity of segments bonded to each other, and the sensor elements with RFID chips are assigned to individual segments.

8. A machining machine according to claim 7, wherein an optical fiber is integrated into the segments, which connects the outer side of the segments with their backside.

\* \* \* \* \*